UNITED STATES PATENT OFFICE.

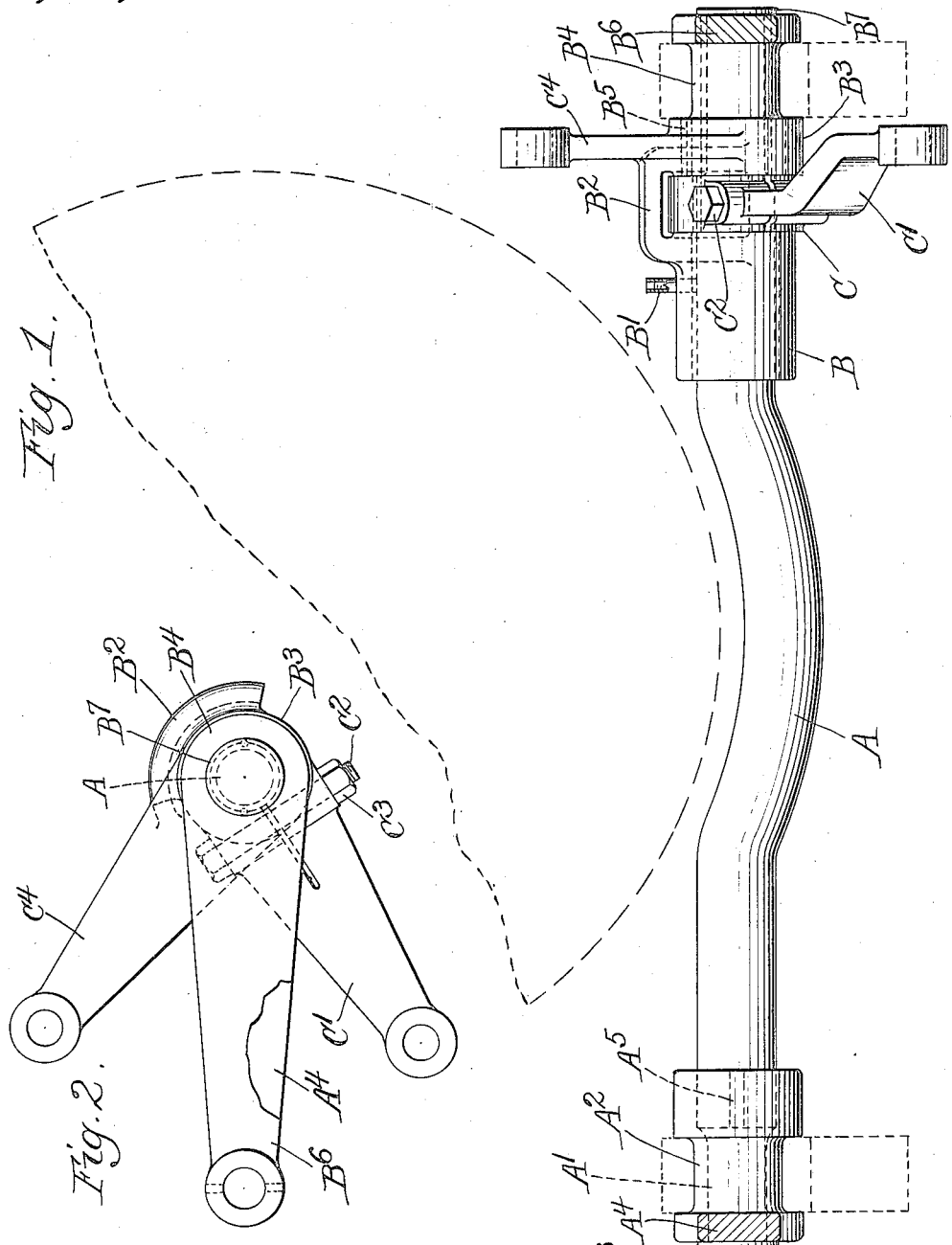

CHARLES W. DAKE, OF CHICAGO, ILLINOIS, ASSIGNOR TO THE PYLE-NATIONAL COMPANY, OF CHICAGO, ILLINOIS, A CORPORATION OF NEW JERSEY.

REVERSING-SHAFT FOR ENGINE VALVE-GEARS.

1,225,931.

Specification of Letters Patent.   Patented May 15, 1917.

Application filed September 18, 1916. Serial No. 120,619.

*To all whom it may concern:*

Be it known that I, CHARLES W. DAKE, a citizen of the United States, residing at Chicago, in the county of Cook and State of Illinois, have invented a certain new and useful Improvement in Reversing-Shafts for Engine Valve-Gears, of which the following is a specification.

My invention relates to improvements in reverse shafts for engine valve gears, and has for one object to provide a reversing shaft whereby motion may be transmitted across the engine from a suitable source to manipulate the reversing part of a valve gear, one on either side of the engine. Another object is to provide such a device which will be rigid, durable, easily adjusted or changed if need be, and which will require a minimum amount of power to operate owing to its stiffness and rigidity. Other objects will appear from time to time in the specification.

I have illustrated my invention by diagrammatically showing in dotted lines some of the parts of a locomotive engine. Other parts not conveniently illustrated have been omitted, but sufficient of the locomotive is shown to show or indicate where my arrangement lies and what its relation is to the locomotive.

My invention is illustrated more or less diagrammatically in the accompanying drawings, wherein—

Figure 1 is a side elevation of the reversing shaft;

Fig. 2 is an end view.

Like parts are indicated by like letters in all the figures.

A is a shaft extending as a rigid integral unit clear across the locomotive, the locomotive parts being indicated in dotted lines so as to show the relation between them and the shaft. The two ends of the shaft are in line. The central portion is downwardly bent as indicated. The left hand end of the shaft is reduced in cross section as indicated at $A^1$. $A^2$ is a hub forced upon the reduced end of the shaft, the hub being held in position by the upset end of the shaft at $A^3$. $A^4$ is a reversing rock arm projecting outwardly from the hub $A^2$ in a substantially horizontal plane, and free of course to move up and down as the shaft rotates. $A^5$ is a key interposed between the hub and the shaft to prevent rotation between the hub and shaft. For strength and stiffness the hub is enlarged where the key is engaged, and the shaft is no longer reduced at that point. Thus danger of breakage or shearing of the key is reduced to a minimum. The hub is reduced as indicated to be received in a bearing, and one of the purposes of reducing the end of the shaft is to permit the presence of the hub without making too large a bearing necessary.

The right hand end of the shaft extends farther out from the curved portion than does the left hand end, and this straight right hand end is provided with a sleeve B, rotatably mounted upon the shaft. Means such as the oil pipe $B^1$ are provided to lubricate the bearing surface between the shaft and the sleeve. $B^2$ is a segment or apron projecting outwardly and forwardly from the outer end of the sleeve B removed from the shaft A. This sleeve or apron carries a ring or collar $B^3$. $B^4$ is a sleeve rotatably mounted on the shaft A, its outside diameter at its inner end being such that it makes a close drive fit inside the collar $B^3$, a key $B^5$ being provided to prevent relative rotation of the collar and the sleeve. $B^6$ is a valve gear reversing rock arm projecting radially from the collar $B^4$ and located in a plane parallel with the plane in which the arm $A^4$ is free to rock. The sleeves B and $B^4$ are neither of them in direct contact with the end of the shaft A, bearing sleeves or liners being provided to furnish a smooth and satisfactory bearing. The shaft A is upset as at $B^7$ to hold the sleeves from being withdrawn away from the end of the shaft.

It will be observed that the extreme end of the shaft A is reduced from the end inwardly as far as the inner side of the collar $B^3$, and the lining sleeve for the main rock arm carrying sleeve $B^4$ is thicker than the lining sleeve for the part B, so that a firm bearing is had on the shaft at all points.

C is a split collar keyed on the shaft A. It has a controlling arm $C^1$ projecting outwardly therefrom and is adapted to be clamped upon the shaft by means of a bolt $C^2$ and nut $C^3$. This collar is located between the shaft and the apron $B^2$, the apron standing out far enough to permit this collar to move freely, the width of the apron being such that the collar can rock with the arm $C^1$ through a predetermined angle without interfering with the apron. It will be noted that the arm C¹ is bent over so that a plane bisecting its outer end and perpendicular to the axis of rotation bisects the outer end also of a rock arm C⁴ on the sleeve B² and these two rock arms are free to move with respect one to another.

It will be noted that the hub B⁴ is reduced in a manner somewhat similar to the hub A² so that a small bearing may be provided to support the right hand end of the shaft and assembly.

It will be evident that while I have shown in my drawings an operative device, still many changes might be made both in size, shape and arrangement of parts without departing materially from the spirit of my invention, and I wish, therefore, that my drawings be regarded as in a sense diagrammatic.

The use and operation of my invention are as follows:

My rock arm arrangement, while primarily adapted for and illustrated as operating to control the reversing part for locomotive valve gear is, of course, equally well adapted to any use where it is desired to transmit angular movement of different directions or values from a certain predetermined source.

It will be understood that any suitable means are provided for rocking the two inner arms, that is to say, the two arms which are in the same plane normal to the axis of the shaft. Preferably means would be provided for moving their ends toward and from one another. When this is done the other parts rock in unison. For instance, if we assume that the rocker arm C¹ is moved in a clockwise direction thence it is rigidly fastened on the shaft A, it is evident that the arm A⁴ will move in the same direction. Meanwhile, if we assume that the arm C⁴ is moved in a counter clockwise direction, the arm B⁶ will of course move in the same direction because there is a direct connection between them through the medium of the key and sleeve. The two elongated hubs or sleeves supporting the arm C⁴ and the arm B⁶ are provided so as to furnish a firm and satisfactory bearing for these parts and prevent all twisting or distortion.

The power is carried across the engine by the single shaft, and therefore this single shaft can be bent, deformed, or otherwise manipulated to provide for changes or irregularities in design. For instance, if the locomotive boiler comes down below the line of the bearing, it is possible to bend the shaft down so that it will clear the locomotive boiler without interfering with the operation in any way. If, owing to changes in the design, it becomes necessary to have a longer shaft, it is necessary only to change the single rigid shaft. The sleeves and other supporting and predetermined parts are in no way changed or varied in any way, and since all the parts form a firm and rigid bearing for one another, and since the shaft runs clear through to form a rigid back bone between the two supporting bearings, it is evident that no distortion or bending of the parts is likely to take place.

I claim:

1. A reversing shaft assembly for steam engines and the like comprising a central rigid shaft, a bearing for one end thereof, a rock arm rigidly mounted thereon adjacent the bearing, a sleeve rotatable on the other end of the shaft, a bearing for the sleeve, a rock arm rigidly mounted on the sleeve adjacent the end of the shaft and a pair of rock arms having their ends located in a common plane perpendicular to the axis of the shaft intermediate its ends, one of them being mounted on the sleeve and the other on the shaft.

2. A reversing shaft assembly for steam engines and the like comprising a rigid continuous central shaft, bearings at either end thereof, a sleeve rotatably mounted on one end of the shaft within one of said bearings, a rock arm on the sleeve adjacent the end of the shaft and a rock arm mounted on the opposed end of the shaft, the sleeve being expanded and cut away for a portion of its circumference intermediate its end, a rock arm on the shaft in line with the expanded portion of the sleeve projecting outwardly through the cutaway portion and a rock arm on the sleeve adjacent the latter.

3. A reversing shaft assembly for steam engines and the like comprising a rigid central shaft, bearings adjacent the ends of the shaft, a sleeve mounted on one end of the shaft within one of said bearings and rock arms adjacent the ends of the shaft one on the sleeve, the other on the free end of the shaft, a collar mounted on the shaft intermediate the ends of the sleeve, the sleeve being expanded and cut away for a portion of its circumference to leave room for said collar, and rock arms one of them on the collar, the other on the sleeve.

In testimony whereof, I affix my signature in the presence of two witnesses this 8th day of September, 1916.

CHARLES W. DAKE.

Witnesses:
 LAUREL M. DOREMUS,
 MINNIE M. LINDENAU.